US006550692B1

(12) United States Patent
Schacht

(10) Patent No.: US 6,550,692 B1
(45) Date of Patent: Apr. 22, 2003

(54) SELF-CONTAINED FINISH SPRAYING APPARATUS

(76) Inventor: Mark W. Schacht, 303 58$^{th}$ Ct., West Des Moines, IA (US) 50266

( * ) Notice: Subject to any disclaimer, the term of this patent is extended or adjusted under 35 U.S.C. 154(b) by 101 days.

(21) Appl. No.: 09/816,974

(22) Filed: Mar. 23, 2001

(51) Int. Cl.$^7$ .................................................. A01G 25/09

(52) U.S. Cl. ........................ 239/172; 239/304; 239/307; 239/310; 239/318; 239/379; 239/398

(58) Field of Search ................................. 239/172, 175, 239/302–304, 307, 308, 310, 318, 379, 142, 398, 405, 418, 419; 222/145.6, 626; 366/160.2, 11

(56) References Cited

U.S. PATENT DOCUMENTS 1,602,105 A * 10/1926 Geer et al. ............... 366/106.2
2,603,462 A * 7/1952 Brown et al. ............ 366/106.2
3,831,849 A * 8/1974 Studinger ................... 239/172
3,841,527 A * 10/1974 Von Roeschlaub .......... 222/146
3,858,761 A * 1/1975 O'Dell ....................... 239/172
4,311,274 A * 1/1982 Neal .......................... 239/172
4,723,710 A * 2/1988 Lucore, II ................... 239/172
5,125,764 A * 6/1992 Veath, Sr. ................... 404/108
6,234,408 B1 * 5/2001 Stevens et al. ............. 239/172

* cited by examiner

*Primary Examiner*—Michael Mar
*Assistant Examiner*—Dinh Q. Nguyen
(74) *Attorney, Agent, or Firm*—James A. Napier

(57) ABSTRACT

A self-contained finish spraying apparatus that allows a user to transport the apparatus to a job site and provides the tools to conduct finish spraying regardless of the lack of necessary components at the job site, such as water and electricity, is claimed and described herein. The apparatus includes a generator, a water tank, a dry material silo, a mixer, an air compressor, and a conventional viscous sprayer. The apparatus includes all or most of these materials within security walls so that the apparatus may be left at an exterior location at a job site without risk of damage to the machinery by vandalism or theft.

11 Claims, 4 Drawing Sheets

SELF-CONTAINED FINISH SPRAYING APPARATUS

BACKGROUND OF THE INVENTION

1. Field of the Invention

This invention relates to the art of spray coating a building and particularly to an exterior insulation finish system ("EIFS") employed in residential and commercial construction projects.

2. Description of the Prior Art

Exterior insulation finish systems ("EIFS") are commonly employed in construction projects. EIFS conventionally uses sheets of insulation material, such as polystyrene, which are mounted to the exterior surface of a building. The sheets of polystyrene are then sprayed with a base coat, which commonly consists of a cement-based material. A fiberglass mesh material is conventionally embedded in the base coat before it dries. A finish coat is then applied over the base coat. The finish coat commonly comprises a plaster-based material. The end product is a wall with an aesthetically pleasing appearance and superior insulative properties.

Although most commonly applied by hand, machinery is available for applying the base and finish coats. Most commonly, these machines comprise a dual-hose/single nozzle apparatus such as that described in U.S. Pat. No. 5,328,096 to Stenge, et al. The machinery comprises an air compressor connected to a nozzle by an air tube, and a pump connected to the same nozzle by a tube through which viscous material is forced. The compressed air atomizes the viscous material and directs the viscous material toward the subject surface.

Similarly, EIFS application machinery is manufactured by STO® which incorporates not only the pump/air compressor/nozzle arrangement, but also includes a mixing silo and an electrical generator, as well. The inclusion of these machines with the conventional spraying apparatus allows a user to transport the apparatus to a remote site and employ EIFS at that remote site.

Transportable EIFS application machinery is not without problems, however. Often, on remote sites, an inadequate water supply exists for the preparation of the base coat, the creation of which commonly requires the mixing of dry material with water. Additionally, water that may be available at the site may not be of an appropriate temperature to provide optimal application. Ideally, the water used in the base coat material should be between 60 degrees Fahrenheit and 75 degrees Fahrenheit. Water that is pumped directly from under ground may be below this temperature range. Water that is pumped above ground, in hoses or the like, may become too warm for proper mixing, application, and adhesion.

Additionally, no EIFS application apparatus exists which may be left at a job site for more than a working day. This is due to lack of incorporation of security measures on available machines. Further, no EIFS apparatus is available which allows more than one sprayer to be used at a time. Finally, no existing machine allows base coat and a finish coat to be sprayed simultaneously.

SUMMARY OF THE INVENTION

Described is a self-contained finish spraying apparatus that allows a user to transport the apparatus to a job site and provides the tools to conduct finish spraying regardless of the lack of necessary components at the job site, such as water and electricity. The apparatus includes a generator, a water tank, a dry material silo, a mixer, an air compressor, and a conventional viscous sprayer. The invention includes all or most of these materials within security walls so that the apparatus may be left at an exterior location at a job site without risk of damage to the machinery by vandalism or theft.

It is therefore a principal object of the invention to provide a self-contained finish spraying apparatus that allows a user to transport the apparatus to a remote job site and leave the apparatus at the job site for an extended period of time.

Yet another object of the invention is to provide a self-contained finish spraying apparatus that provides uniform mixing and spraying results.

Still another object of this invention is to provide a finish spraying apparatus that may be used by more than one operator at a time.

Still another object of the invention is to provide a self-contained finish spraying apparatus that allows for the application of base coat material and finish coat material simultaneously.

These and other objects of the invention will be apparent to those skilled in the art.

DESCRIPTION OF THE PREFERRED EMBODIMENT

Figure 1:
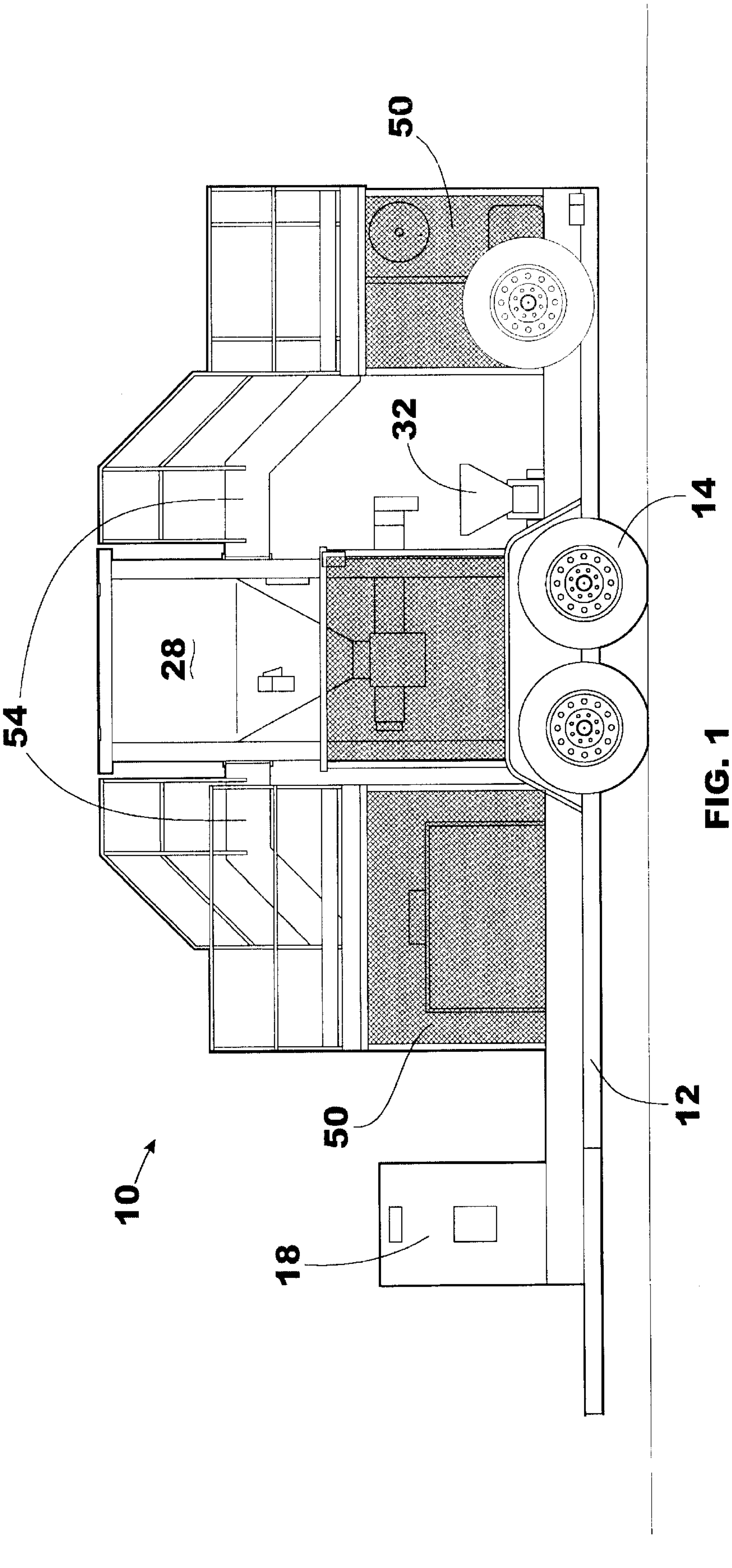
FIG. 1 is a side elevational view of the apparatus.
Figure 2:
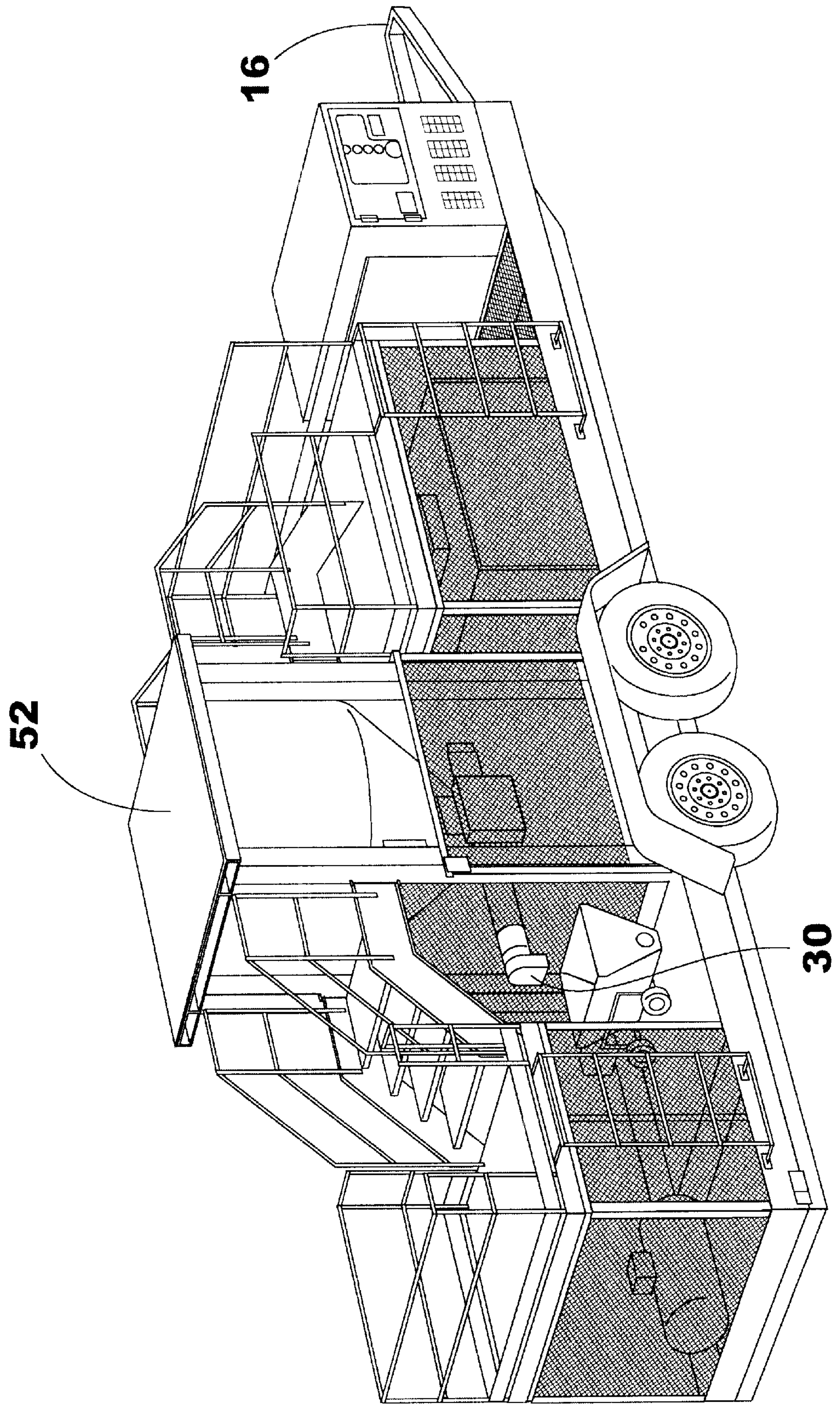
FIG. 2 is a perspective view of the apparatus.
Figure 5:
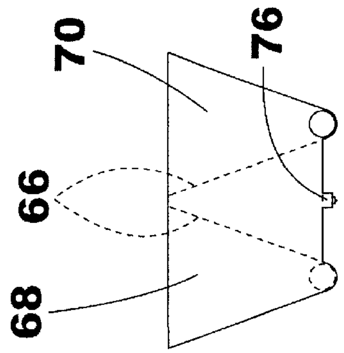
FIG. 5 is a left side elevational view of the dual hopper configuration with the level sensor removed.
Figure 4:
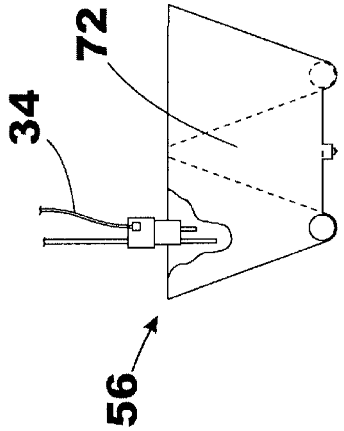
FIG. 4 is a right side elevational view of the dual hopper configuration with a level sensor.
Figure 6:
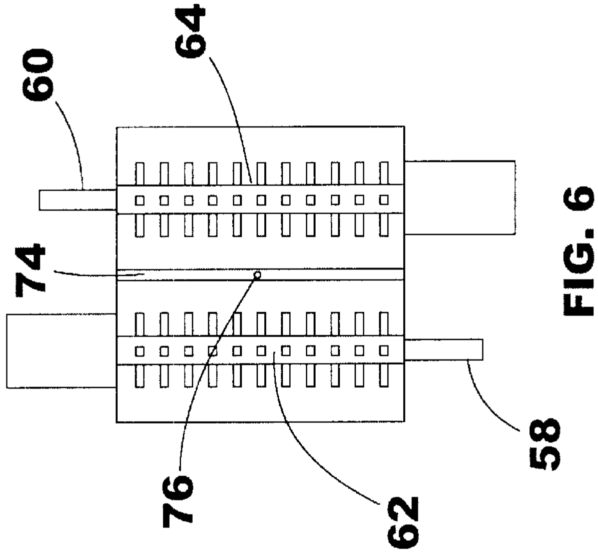
FIG. 6 is a top view of the dual hopper configuration.
Figure 3:
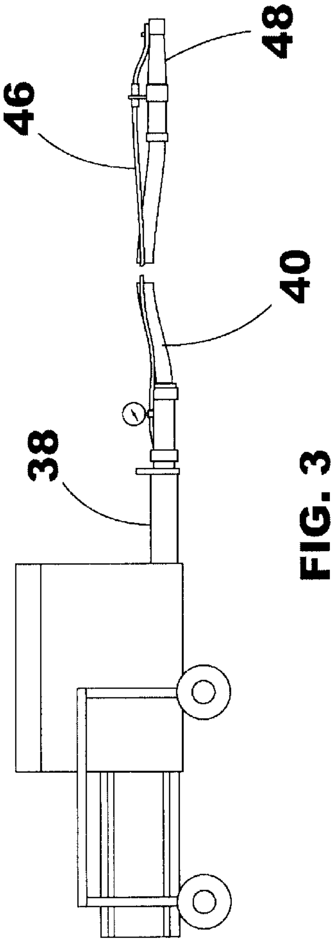
FIG. 3 is a front elevational view of the hopper and slurry pump configuration.
Figure 7:
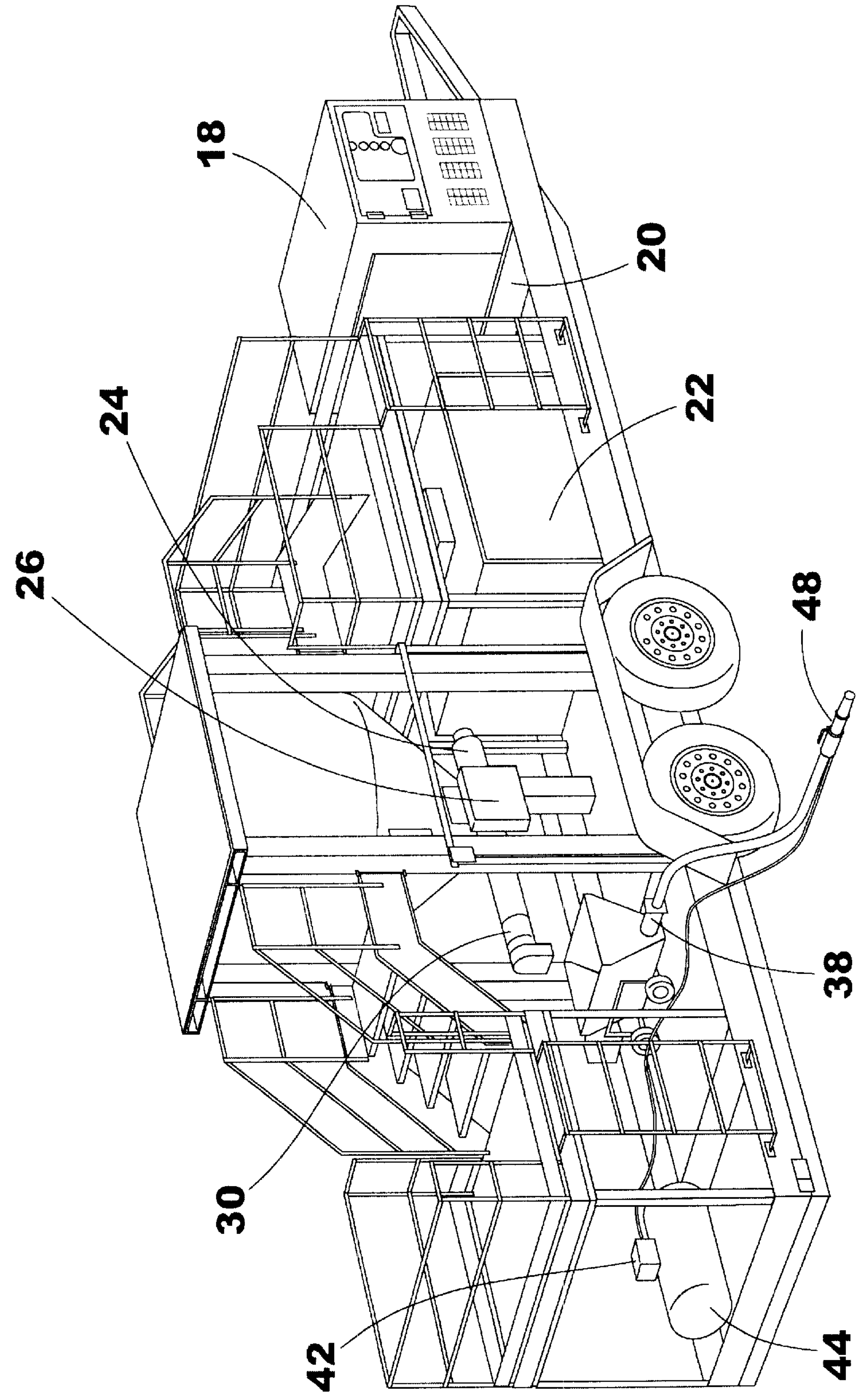
FIG. 7 is a perspective view of the apparatus with the security walls removed.

EIFS base and finish coatings are commonly applied by hand. The introduction of spraying materials has only been introduced recently. The subject apparatus comprises spraying technology and additional features that will allow the apparatus to be self-contained, easy transportable, and secure.

The apparatus is shown generally at 10. The apparatus 10 is constructed on a frame 12 that supports the several components of the apparatus 10. Ideally, the frame 12 will include wheels 14 and a tongue 16 so that the apparatus 10 may be employed as a trailer.

The apparatus 10 includes a generator 18 for the provision of electrical power to various components. The generator 18 is preferably a 25 kw generator and capable of generating three-phase power. The generator 18 may also include an oversized fuel tank 20. The larger fuel tank will allow the generator to run for several days without refueling, obviating the need to remove the apparatus 10 from a job site. The apparatus 10 also includes a water tank 22. Preferably, the water tank 22 is insulated to maintain the temperature of the water therein between 60° F. and 75° F. Both the oversized fuel tank 20 and the water tank 22 may include baffles (not shown) to provide stability in the transporting of the apparatus 10 when one or both tanks are full.

The apparatus 10 further comprises a water pump 24. The water pump 24 is adapted to draw water from the water tank 22 and feed it to a continuous mixer 26. The continuous mixer 26 is also attached to a dry material silo 28. The dry material silo is designed to hold particulate dry material and mave have an agitator (not shown) for facilitating the dispensation of the dry material.

The continuous mixer 26 is adapted to mix precise amounts of dry material from the dry material silo 28 and water from the water pump 24 to create a slurry. The slurry is discharged from the continuous mixer 26 through a discharge end 30 and into a hopper 32.

The hopper 32 includes a level sensor 34, which is connected to the continuous mixer 26. The level sensor 34 is adapted to shut down the continuous mixer 26 and cease production of the slurry when the hopper 32 is filled to a predetermined level. When that level falls, the level sensor 34 is adapted to activate the continuous mixer 26 and resume the production of the slurry. The hopper 32 may also include a paddle, such as first paddle 62, or other mechanism to prevent the setting of the slurry within the hopper 32.

A slurry pump 38 is also connected to the hopper 32 and adapted to draw the slurry from the hopper 32 and into a slurry hose 40. The slurry pump 38 preferably comprises a standard rotor and stator design and runs on three-phase power provided by the generator 18. Likewise, the continuous mixer 26 also operates on three-phase power provided by the generator 18.

The apparatus 10 also includes an air compressor 42. The air compressor 42 may be individually gasoline powered, but is preferably operated by electricity provided by the generator 18. The air compressor 42 will commonly include an air tank 44 and will supply compressed air to an air hose 46. The slurry hose 40 and air hose 46 are connected to a conventional spray nozzle 48, adapted for combining the slurry and the compressed air so that the slurry is atomized and sprayed on the subject surface.

As shown in FIG. 1, the apparatus 10 further includes several security walls 50. The security walls 50 should, ideally, allow visual inspection of the machinery therein, but prevent access to many, if not all, the components of the apparatus 10 by unauthorized persons. Expanded metal mesh or chain link material would be suitable for this purpose. The apparatus 10 should also include a silo lid 52 to prevent the introduction of water into the dry material silo 28. The silo lid 52 should be, like the security walls 50, capable of being secured in place and immovable by unauthorized individuals. The apparatus 10 may also include decks 54 on either side of the dry material silo 28. The decks may be used for storage of bags of dry material and for access to the upper opening of the dry material silo 28. Although it is contemplated that the dry material may be loaded into the silo by forklift, the decks 54 allow the manual introduction of dry material. The decks 54, which may or may not include the additional steps shown, also provide stability to the dry material silo 28 when the apparatus 10 is being transported.

In another embodiment of the apparatus 10, a dual hopper 56 replaces the hopper 32. The dual hopper 56 is capable of supporting a first slurry pump 58 and a second slurry pump 60. The hopper 56 also may be adapted to house a first paddle 62 and a second paddle 64 to prevent the setting of the slurry within the dual hopper 56. The dual hopper 56 allows for two operators to spray material through first and second spray nozzles (not shown) simultaneously.

The dual hopper 56 may also be adapted to allow two operators to spray different materials from the first and second spray nozzles (not shown) simultaneously. Dual hopper 56 may include one or more removable interior walls 66. The removable interior walls 66 define a first separate hopper chamber 68 and a second hopper chamber 70. The removable interior walls 66 will also define a void hopper chamber 72. The void hopper chamber 72 will be difined, in part, by the floor of the dual hopper 56, which should also contain a channel 74 that runs from one side of the void hopper chamber 72 to the other. The channel 74 should also include a drain 76, that may be closed selectively, for the removal of material that leaks into the void hopper chamber 72 from either the first hopper chamber 68 or the second hopper chamber 70. The above-described configuration prevents the commingling of materials within the first hopper chamber 68 and second hopper chamber 70. When the dual hopper 56 is to be used as a hopper for only one material, without the removable side walls 66, the drain 76 should be closed.

Additional features may be incorporated in the apparatus 10. Remote shut-off switches (not shown) should be available to operators. Such remote shut-off switches (not shown) would allow an operator to shut off the machinery from a remote location, such as the location where the conventional spray nozzle 48 is being employed. Additionally, the continuous mixer discharge end 30 should feed into the first hopper chamber 68. It is contemplated that the finish coat will be supplied to the second hopper chamber 70. The finish coat material conventionally comes premixed in barrels, obviating the need for a second continuous mixer assembly.

Thus it can be seen that the objects of the invention have been met.

I claim:

1. A self-contained finish spraying apparatus comprising:

a frame;

an electrical generator mounted on said frame for generation of electrical power;

a silo mounted on said frame and adapted to hold dry material, said silo having an open upper end and an open lower end;

a water tank mounted on said frame and containing water;

an air compressor being mounted on said frame and having an air output, said air compressor being adapted to produce compressed air and to discharge the compressed air through said air output;

a water supply channel having a first end and a second end, said first end being in communication with the water in said water tank;

a water pump having a discharge valve and being in communication with said second end of said water supply channel;

said water pump being adapted to draw the water through said water supply channel and out of said discharge valve;

a continuous mixer mounted on said open lower end of said silo, said continuous mixer being functionally connected to said electrical generator for provision of electrical power thereto and being adapted to receive dry material from said open lower end of said silo and mix the dry material with water from said discharge valve to create a slurry;

said continuous mixer having a discharge end through which the slurry is discharged from said continuous mixer;

a slurry pump having a slurry discharge valve and being in functional communication with said discharge end of said continuous mixer;

said slurry pump being adapted to draw the slurry from said continuous mixer and out of said slurry discharge valve;

a slurry supply hose having first and second ends, said first end of said slurry supply hose being in communication with said slurry discharge valve;

an air supply hose having first and second ends, said first end of said air supply hose being in communication with said air output; and a spray nozzle mounted on said second end of said slurry supply hose and said second end of said air supply hose; said spray nozzle being adapted to receive compressed air from said second end of said air supply hose, to receive slurry from said second end of said slurry supply hose, and to employ the compressed air to dispense the slurry;

whereby said apparatus may be moved selectively to a job site.

2. The self-contained finish spraying apparatus of claim 1, further comprising wheels mounted said frame so that said frame may be used like a trailer.

3. The self-contained finish spraying apparatus of claim 1 whereby at least one of said air compressor, said water pump, or said slurry pump is functionally connected to said electrical generator for provision of electrical power thereto.

4. The self-contained finish spraying apparatus of claim 1, further comprising:

a hopper being positioned on said frame such that the slurry is discharged from said discharge end of said continuous mixer into said hopper, said hopper being functionally connected to said slurry pump and providing a functional connection between said discharge end of said continuous mixer and said slurry pump.

5. The self-contained finish spraying apparatus of claim 4, further comprising:

a second slurry pump having a second slurry discharge valve and being in functional communication with said hopper;

said second slurry pump being adapted to draw the slurry from said hopper and out of said second slurry discharge valve;

a second slurry supply hose having first and second ends, said first end of said second slurry supply hose being in communication with said second slurry discharge valve;

a second air supply hose having first and second ends, said first end of said second air supply hose being in communication with said air output; and a second spray nozzle mounted on said second end of said second slurry supply hose and said second end of said second air supply hose; said second spray nozzle being adapted to receive compressed air from said second end of said second air supply hose, to receive slurry from said second end of said second slurry supply hose, and adapted to employ the compressed air to dispense the slurry.

6. The self-contained finish spraying apparatus of claim 5, further comprising walls mounted on said frame such that access to the components of the apparatus are inaccessible to unauthorized persons.

7. The self-contained finish spraying apparatus of claim 4, further comprising:

a second slurry pump having a second slurry discharge valve and being in functional communication with said hopper;

said second slurry pump being adapted to draw slurry from said hopper and out of said second slurry discharge valve;

a second slurry supply hose having first and second ends, said first end of said second slurry supply hose being in communication with said second slurry discharge valve;

a second air supply hose having first and second ends, said first end of said second air supply hose being in communication with said air output; and a second spray nozzle mounted on said second end of said second slurry supply hose and said second end of said second air supply hose; said second spray nozzle being adapted to receive compressed air from said second end of said second air supply hose, to receive slurry from said second end of said second slurry supply hose, and adapted to employ the compressed air to dispense slurry, wherein said hopper has a first chamber and a second chamber, said first chamber being in functional connection with said slurry pump and said second chamber being in functional connection with said second slurry pump, said first chamber adapted to hold a material that differs from a material in said second chamber.

8. The self-contained finish spraying apparatus of claim 7, wherein said first chamber and said second chamber are formed by the selective insertion of at least one wall in said hopper.

9. The self-contained finish spraying apparatus of claim 8, wherein said at least one wall comprises at least two walls and said hopper further includes a floor and a drain in a part of said floor within a space defined by said at least two walls and being adapted to prevent the pollution of said material in said first chamber by said material in said second chamber and the pollution of said material in said second chamber by said material in said first chamber.

10. The self-contained finish spraying apparatus of claim 1, further comprising walls mounted on said frame such that access to the components of the apparatus are inaccessible to unauthorized persons.

11. The self-contained finish spraying apparatus of claim 1, further comprising at least one deck proximal said silo and being adapted to stabilize said silo.

* * * * *